(12) United States Patent
Krasic et al.

(10) Patent No.: US 8,752,112 B2
(45) Date of Patent: Jun. 10, 2014

(54) LIVE STREAMING VIDEO PROCESSING

(75) Inventors: Charles Christian Krasic, Mountain View, CA (US); Vijnan Shastri, Palo Alto, CA (US); Krishna Kumar Gadepalli, Fremont, CA (US); Yang Xia, San Jose, CA (US); Krishnan Eswaran, Oakland, CA (US); Wendy Tobagus, Cupertino, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/445,620

(22) Filed: Apr. 12, 2012

(65) Prior Publication Data

US 2013/0276048 A1    Oct. 17, 2013

(51) Int. Cl.
*H04N 21/234*    (2011.01)

(52) U.S. Cl.
USPC .......................... 725/116; 725/109; 725/147

(58) Field of Classification Search
CPC ................. H04N 21/234; H04N 21/2343
USPC ............................. 725/116, 109, 146
See application file for complete search history.

(56) References Cited

U.S. PATENT DOCUMENTS

| | | | |
|---|---|---|---|
| 6,407,680 B1 | 6/2002 | Lai et al. | |
| 7,117,499 B2 * | 10/2006 | Kawamoto et al. | 718/105 |
| 8,042,142 B1 | 10/2011 | Doshi et al. | |
| 2004/0166834 A1 * | 8/2004 | Omar et al. | 455/414.1 |
| 2008/0086570 A1 | 4/2008 | Dey et al. | |
| 2008/0195664 A1 * | 8/2008 | Maharajh et al. | 707/104.1 |
| 2009/0274212 A1 * | 11/2009 | Mizutani et al. | 375/240.12 |
| 2011/0182424 A1 * | 7/2011 | Grube et al. | 380/43 |
| 2012/0265853 A1 * | 10/2012 | Knox et al. | 709/218 |
| 2013/0064286 A1 * | 3/2013 | Karlsson et al. | 375/240.02 |

FOREIGN PATENT DOCUMENTS

WO    2009020552    2/2009

OTHER PUBLICATIONS

International Search Report and Written Opinion for International Application U.S. Appl. No. PCT/US2013/036442, dated Jul. 16, 2013, 11 pages.

* cited by examiner

*Primary Examiner* — Benjamin R Bruckart
*Assistant Examiner* — Tien M Nguyen
(74) *Attorney, Agent, or Firm* — Amin, Turocy & Watson, LLP

(57) ABSTRACT

Systems and methods for processing a live video stream are provided. An ingestion component receives segments of a live video stream in association with a request to process the live video stream. A control component generates an instruction graph for the live video stream based on predetermined criteria. The instruction graph defines a workflow for processing the live video stream, the workflow comprising a set of services for processing the segments. A transcoding component employs a subset of the services to process the segments based at least in part on the instruction graph and a distribution component then streams the segments to a device in response finishing process of the segments. With the live video processing system, segments of a video stream are processed and distributed as they are received. Thus segments of the video stream are processed and distributed prior to processing of the entire video stream.

20 Claims, 11 Drawing Sheets

LIVE STREAMING VIDEO PROCESSING

TECHNICAL FIELD

This disclosure relates to processing of a live video stream for a live broadcast.

BACKGROUND

Previously, live video broadcasting has been achieved using devices built upon special purpose hardware platforms and largely dedicated networks, employing significant amounts of video specific design elements at the hardware level. Such live broadcasting systems are not well suited to large scale computing infrastructure deployments ("cloud computing"). Further, such live processing systems are stressed by performance and reliability challenges posed in a shared computing infrastructure.

SUMMARY

The following presents a simplified summary of the disclosure in order to provide a basic understanding of some aspects of the disclosure. This summary is not an extensive overview of the disclosure. It is intended to neither identify key or critical elements of the disclosure nor delineate any scope of particular embodiments of the disclosure, or any scope of the claims. Its sole purpose is to present some concepts of the disclosure in a simplified form as a prelude to the more detailed description that is presented later.

In accordance with one or more embodiments and corresponding disclosure, various non-limiting aspects are described in connection with processing live video for stream for a live broadcast.

In accordance with a non-limiting embodiment, a system is provided comprising an ingestion component that ingests segments of a live video stream in association with a request to process the live video stream. A control component further generates an instruction graph for the live video stream based on predetermined criteria. The instruction graph defines a workflow for processing the live video stream in real time, wherein the workflow comprises a set of services for processing the segments. In addition, the system comprises a transcoding component that employs the set of services to process the segments in real time based at least in part on the instruction graph, a distribution component that streams the processed segments to a client in real time for live broadcasting of the live video stream. In an aspect, the ingestion component receives the segments in a sequence, the transcoding component finishes process of respective ones of the segments in an order of the sequence, and the distribution component streams a segment in response to finishing process of the segment.

In another non-limiting embodiment, provided is a method comprising receiving segments of a live video stream of a live video broadcasting in association with a request to process the live video stream and generating an instruction graph for the live video stream based on predetermined criteria. The instruction graph defines a workflow for processing the live video stream in real time, the workflow comprising a set of services for processing the segments. The method further comprises executing a subset of the services to process the segments in real time based at least in part on the instruction graph, including: using a first service to finishing processing a first segment, streaming the first segment to a second service, and processing a second segment of the live video stream by the first service. In an aspect, the method further comprises streaming the segments to a device in response to processing of the segments, wherein the receiving the segments, the processing the segments, and the streaming the segments are performed substantially concurrently.

In yet another non-limiting embodiment a computer-readable storage medium is provided comprising computer-readable instructions that, in response to execution, cause a computing system to perform operations, comprising receiving segments of a live video stream of a live video stream in association with a request to process the live video stream and generating an instruction graph for the live video stream based on predetermined criteria. The instruction graph defines a workflow for processing the live video stream in real time, the workflow comprising a set of services for processing the segments. The operations further include processing the segments with a subset of the services based at least in part on the instruction graph. In addition the operations may include reprocessing the segments of the live video stream with the subset of the services, in response to a processing failure associated with any one of the services in the subset. The operations also include streaming the processed segments to a client in real time for live broadcasting of the live video stream.

DETAILED DESCRIPTION

Overview

Figure 1:
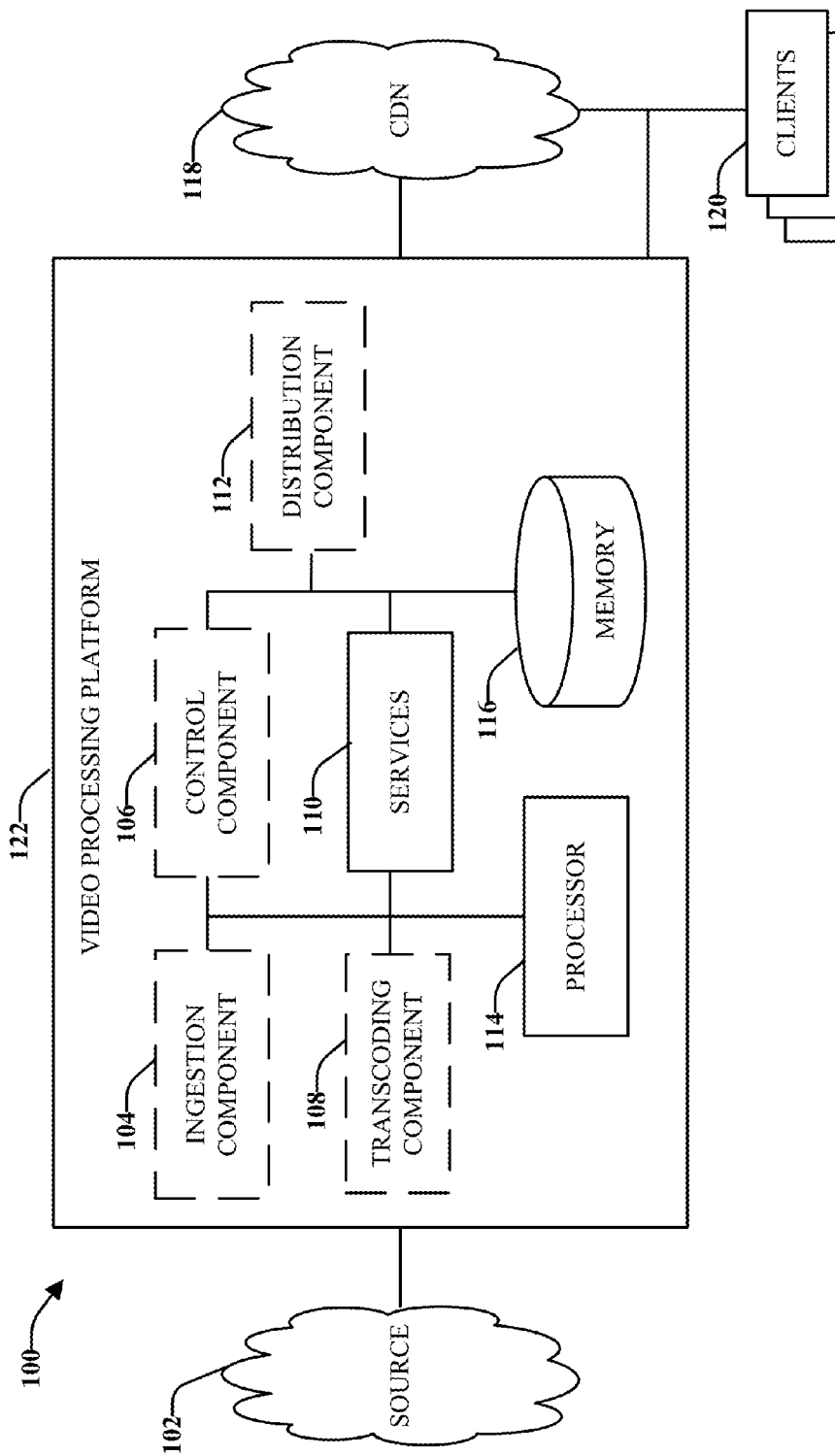
FIG. 1 illustrates an example non-limiting live video processing system that facilitates processing of live video streams for live video broadcasts in accordance with various aspects and implementations described herein.

The innovation is now described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and components are shown in block diagram form in order to facilitate describing the innovation.

By way of introduction, the subject matter disclosed herein relates to processing of a live video stream for a live broadcast. Live video transcoding systems and methods are provided that are designed to deliver a live video to all audiences around the world. In particular, live transcoding system and methods provided herein serve live content in many formats and many resolutions at many bit rates so they can be consumed by all user devices (such as tablets, phones, televisions and notebooks) via any medium (WiFi, 3G, 4G, etc.). The subject live processing systems and methods produce multiple output streams in real-time from a single live input stream.

A distributed live video processing system is provided that facilitates real-time processing of video streams, suitable for live broadcast using Internet content distribution networks (CDNs). The system is designed to operate on general purpose compute servers and networks, that are broadly optimized across a wide array of applications, as opposed to tightly optimized to narrow and specific set of applications. These optimizations in terms of price vs. performance are suited to large scale computing infrastructure deployments ("cloud computing"). The subject live processing systems and methods employ several mechanisms to overcome performance and reliability challenges posed in a shared computing infrastructure, in exchange for benefiting from numerous economies of scale provided by such an environment in terms of hardware costs, operational costs, and opportunity costs related to so called elasticity or agility of deployment.

Example Live Streaming Video Processing

Referring now to the drawings, with reference initially to FIG. 1, a live video processing system 100 that facilitates processing of live video streams for live video broadcasts. Aspects of the systems, apparatuses or processes explained in this disclosure can constitute machine-executable component embodied within machine(s), e.g., embodied in one or more computer readable mediums (or media) associated with one or more machines. Such component, when executed by the one or more machines, e.g., computer(s), computing device(s), virtual machine(s), etc. can cause the machine(s) to perform the operations described. System 100 can include memory 116 for storing computer executable components and instructions. A processor 114 can facilitate operation of the computer executable components and instructions by the system 100.

In an embodiment, system 100 includes a video processing platform 122 that includes ingestion component 104, control component 106, transcoding component 108, services 110, and distribution component 112. Ingestion component 104 receives segments of a live video stream in association with a request to process the live video stream. For example, ingestion component 104 can receive the segments and associated request from a source 102, such as a live video broadcasting network. In another example, the ingestion component 104 can receive the segments from a source 102 in association with a request for the live video stream by a client 120. Control component 106 generates an instruction graph for the live video stream based on predetermined criteria. The instruction graph defines a workflow for processing the live video stream and comprises of a set of services for processing the segments. Then, at the direction of the control component 106 the transcoding component 108 employs a subset of the services to process the segments based at least in part on the instruction graph. Upon finishing process of the segments, a distribution component then streams the segments to a client device 120. In an aspect, the processing systems streams the segments to a client device 120 via one or more content distribution networks (CDN) 118.

System 100, (and additional systems disclosed herein) is configured to process live video. In an embodiment, the video processing platform 122 receives video and distributes video over a network using a streaming media protocol. For example, system 100 can employ an HTTP-based media streaming communications protocol that works by breaking the overall stream into a sequence of small HTTP-based file downloads, each download loading one short chunk of an overall potentially unbounded transport stream. For example, system 100 can employ HTTP Live Streaming (HLS) to receive and/or distribute live video. In another example the system 100 can employ smooth streaming or HTTP dynamic streaming to receive and distribute video. Further, video processing platform 122 may receive and distribute live video using flash video (FLV) streaming. When live video is streamed to a client via system 100 (and additional systems described herein), the live video is configured to play in real-time or substantially real time at the client device. In an aspect, live video is played and viewed by a user via a browser on web page with an associated player (e.g. a flash player). In another aspect, the live video can be in an HLS format encoded directly into the web page.

Additional example protocols for streaming video in particular embodiments can include but are not limited to User Datagram Protocol (UDP), Real-Time Streaming Protocol (RTSP), Real-Time Transport Protocol (RTP), Real-Time Transport Control Protocol (RTCP), and Transmission Control Protocol (TCP). Reference to a video may encompass a video stream or a video segment and vice versa, where appropriate. In particular embodiments, reference to a video stream encompasses any suitable format for communicating the video that enables separate portions of the video to be processed individually for a live video broadcast.

System 100 can employ any suitable network configured to support live video processing and streaming. In an aspect, the network can include an Internet, intranet, a cellular service network, a virtual private network (VPN), a local area network (LAN), a wireless LAN (WLAN), a wide area network (WAN), a metropolitan area network (MAN), a portion of the Internet, or a combination of two or more such networks. The present disclosure contemplates any suitable network for receiving, processing and distributing a live video stream.

Video processing platform 122 initially begins processing of a live video upon receipt of a request to process the live video. The request can include the receipt of a live video stream at ingestion component 104 from a source 102. A source 102 can include any live video provider. For example, a source 102 can include a commercial broadcasting television network, or a small entity broadcaster streaming live video. Video processing platform 122 receives a live video stream at ingestion component 104. In an aspect, ingestion component 104 receives a stream request for an original live video stream and outputs the live stream to the transcoding component 108 for live transcoding. In an aspect, to service initializes transcoding by making one or more copies of the live video segment for concurrent transcoding of the one or more copies according to different workflows.

Processing platform 122 is configured to support live streaming of video, including receipt, transmission, and storage of live video and audio in various formats. In particular, ingestion component 104 can receive live video in various multimedia container files that support live video broadcasting. For example, in an aspect, ingestion component 104 receives a live video stream as an MPEG-2 transport stream (M2TS). In another example, ingestion component 104 can receive a live video stream formatted as any one or more of the following: a (flash video) FLV file, a F4V file, a MPEG-4 file, a MPEG-4 part 12 file, an Ogg file, an advance video coding (AVC) file, a H264 file, a H264/MPEG-4 AVC file, an advanced audio coding (AAC) file, or a real media (RM) file. It should be appreciated that the above formats are merely provided for exemplary purposes and that additional coding formats that support receipt, transmission, and storage of live video streams can be employed by processing platform.

In an embodiment, in order to process a live video stream, processing platform 122 divides the live video stream into chunks or segments of video. In turn, the chunks or segments are passed through a processing pipeline associated with the transcoding component 108. The processed video chunks or segments are then provided to CDN 118 for streaming to a client device 120. In an aspect, a live video stream is received in segments or chunks by processing platform 122. In another aspect, the processing platform 122 performs segmenting or chunking of a live video stream during the processing of the live video stream. As used herein, the terms segmenting or chunking refer to the process of organizing a live video stream into separate segments or chunks.

The terms video chunk and video segment are used herein interchangeably. A video chunk or segment refers to a portion of a video stream. In an aspect, respective chunks or segments comprise one or more frames of video. A chunk or segment of video can include any suitable amount of data to facilitate real-time, or near real-time processing of a live video stream. In an aspect, processing platform 122 divides a live video stream into chunks of a size that facilitates HLS distribution of the processed video chunks. For example, the processing platform may divide a live video stream into chunks comprising a first amount of data appropriate for HLS distribution. In turn the processed chunks can be of a size ready for HLS distribution. In another aspect, the processing platform 122 may divide a live video stream into chunks comprising a first amount of data that is not designed for optimal HLS. In turn, the chunks can be re-organized into segments appropriate for HLS at a processing step or task prior to publishing.

Figure 2:
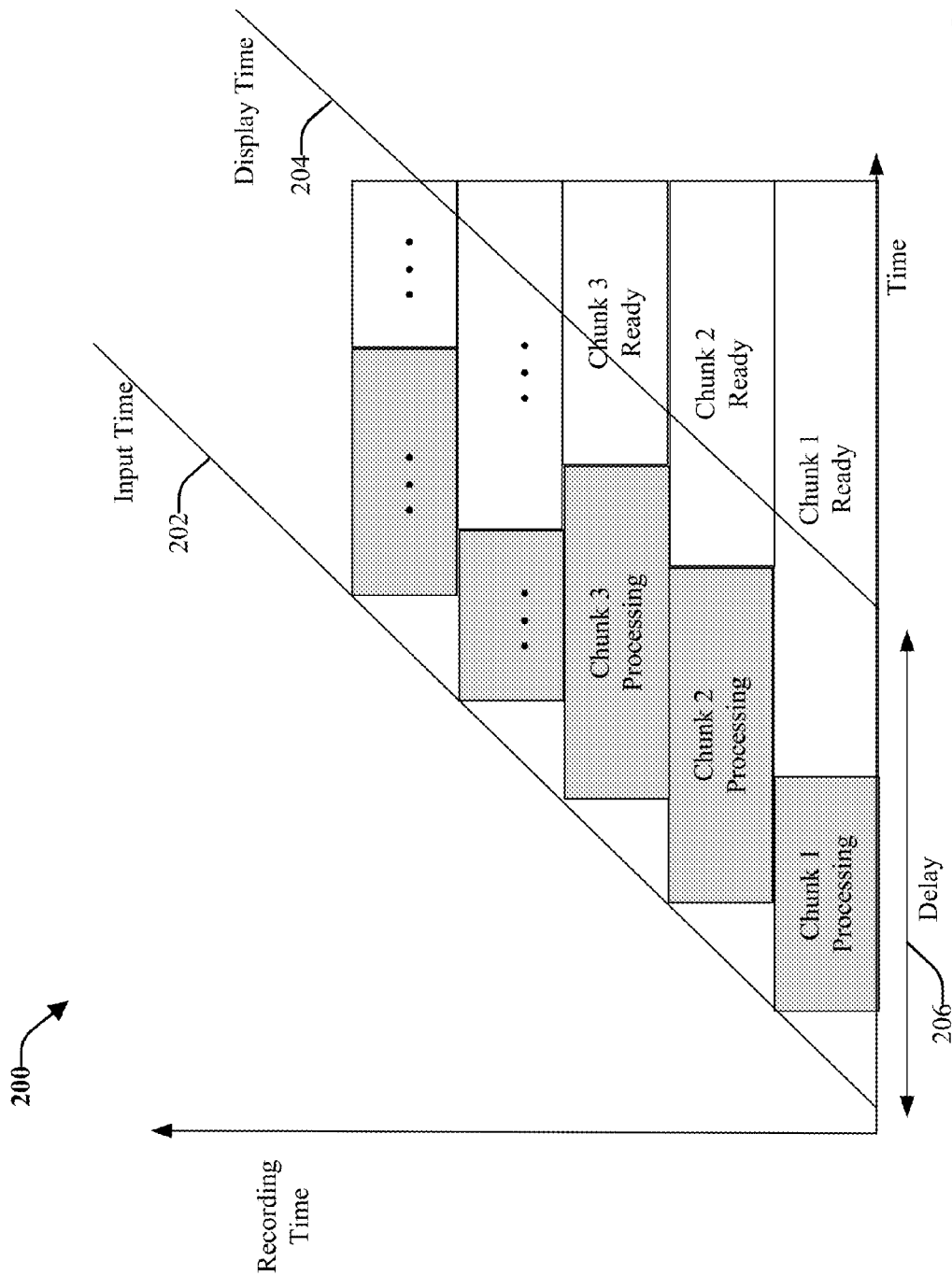
FIG. 2 illustrates a non-limiting graphical depiction of an exemplary processing flow of a live video stream by a live video processing system in accordance with various aspects and implementations described herein.

FIG. 2 presents a graphical depiction 200 of an exemplary processing flow of a live video stream by system 100 (an additional systems described herein). With live video processing systems disclosed herein, segments of a live video stream are processed and distributed as they are received. Thus segments of the video stream are processed and distributed prior to processing of the entire video stream by the system. The subject live transcoding/processing systems divides a video into chunks to guarantee a fixed delay for the target transcoded video. The key bottleneck associated with live transcoding is the actual transcoding of video, which can be slower than real-time when the desired quality is sufficiently high. Chunking of the video facilitates minimizing the transcoding time to reach real-time or near real time processing goals.

As seen in FIG. 2, a video stream is processed in a plurality of chunks (or segments). The chunks are processed as they are recorded and provided to processing platform 122. In an aspect, the processing time and ready time of the various chunks can be different. For example, processing of chunks 2 and 3 is depicted as larger/longer than chunk 1. In an aspect the processing time can directly relate to the ready time of a chunk. Further, the processing time of a chunk can relate to the size (in bytes) of a chunk. For example, in an aspect, chunks of a same video stream can be different sizes or same sizes. Line 202 represents the input time vector and line 204 represents the display time vector. Distance 206 represent the delay between initiation of processing and display time. Assuming some fixed delay, after a video is recorded at which point the video is provided as input to the live video processing system 100, as enough data is received, the system 100 can generate a chunk of video to start processing. In an aspect, the display time 204 in graph 200 corresponds to a worst case processing time of a chunk plus some additional leeway to account for uncertainty, merging/muxing overhead, and other delays in the system 100.

Referring back to FIG. 1, processing system 100 (and additional systems described in this disclosure) provides live video to client devices 120 and/or end viewers. In particular, processing system 100 is configured to distribute a live video to multiple viewers around the world substantially simultaneously. A client device can include any suitable computing device associated with a user and configured to interact with or receive media content. For example, a client device 120 can include a desktop computer, a laptop computer, a smartphone, a tablet personal computer (PC), or a PDA. As used in this disclosure, the terms "consumer," "user" or "viewer" refer to a person, entity, system, or combination thereof that employs processing system 100 (or additional systems described in this disclosure) via a client device.

In an aspect, a client device 120 can initiate a request for a live video broadcast. For example, a client may request to view a live video broadcast at any point in the recording and processing of the live video broadcast. Ingestion component 104 is configured to receive such requests so that the requests are answered with the streaming of the live video broadcast to the client device 120 in an appropriately formatted manner for viewing of the live video broadcast at the client device. In an aspect, processing platform distributes processed live video to clients directly via distribution component 112. In another aspect, processing platform 122 employs one or more CDNs 118 to facilitate streaming of transcoded video streams to clients. Processing platform 122 and/or CDNs 118 can employ any suitable network in order to distribute processed video streams. For example, processing platform 122 and/or CDNs can employ the Internet, an intranet, or cellular service to distribute live video to clients.

In an embodiment, control component 106 controls the flow of the entire live processing system 100, from ingestion, to encoding, and distribution. Control component 106 is configured to oversee servicing of a request for processing a live video broadcast associated with a request. In an aspect, control component 106 can receive requests to process a live video. In turn, control component 106 can control the ingestion of a live video stream associated with a request at ingestion component 102. In an aspect, a request for a live video can include a video identifier (VID). A VID may be a random number identifying the requested video. The present disclosure contemplates any suitable naming scheme. In an aspect, VIDs for live video streams are free form. In addition, the request may include one or more instructions for processing the video. In an aspect, the control component 106 may determine from the VID, the one or more instructions, or a combination of the two, what processing to apply to the video. The request need not supply a complete set of instructions for processing the video. In particular, the control component 106 may determine a complete set of instructions from the VID in the request, the instructions in the request, or a combination of the two.

In an embodiment, when the control component 106 receives a request for processing of a live video, the control component 106 can generate and/or retrieve an instruction graph for the video. Instruction graphs described herein define a workflow for processing a video. In an aspect, instruction graphs for videos are predetermined and stored in memory 116 or an alternative storage component (not shown) accessible to control component 106. For example, a request may include the VID of the video which the control component 106 may use to determine an instruction graph for the video. The control component 106 can employ the VID of a video to determine an instruction graph that is assigned to or associated with the VID in storage. For instance, multiple different instruction graphs may be provided in memory 1116 or other storage and describe different workflows for processing videos having one or more particular properties. As an example and not by way of limitation, a first instruction graph may describe a first workflow for processing videos from a first source for a first client, a second instruction graph may describe a second workflow for processing videos from first source for second client, and a third instruction graph may describe a third workflow for processing videos from a third source for a third client. The control component 106 may map a video for processing to the first, second, or third instruction graphs based on the VID of the video, which may identify the client requesting processing of the video and the source from which the video is received.

In another aspect, the control component 106 may generate or determine an instruction graph based on one or more criteria associated with a processing request. For example, the criteria can account for a variety of factors including but not limited to, a source providing a video, a VID, a classification of video, a client associated with a request, network traffic, source location, client location, time of day, or current network operating parameters, or current processing platform operating parameters and available resources and services. According to this aspect, the control component 106 can determine the various factors above with respect to a current request for processing of a video and apply one or more algorithms that relate one or more of the above described factors to an instruction graph. In an embodiment, the control component 106 can determine an appropriate instruction graph from predefined or preformed instruction graphs in memory or storage. Alternatively, the control component 106 may generate or create tailored instruction graphs for video to be processed based on a determination related to the factors above.

Still in yet another aspect, the control component 106 can employ an employ an intelligence component (not shown) to generate an instruction graph for a requested live video processing instance based on inferred or observed relationships between the one or more factors above. An intelligence component can further employ extrinsic information related to current events and extrinsic information related to influential external systems to generate instruction graphs. An intelligence component can perform inferences to identify a specific context or action, or to generate a probability distribution over states, for example. The inferences can be probabilistic—that is, the computation of a probability distribution over states of interest based on a consideration of data and events. An inference can also refer to techniques employed for composing higher-level events from a set of events or data. Such inference can result in construction of new events or actions from a set of observed events or stored event data, whether or not the events are correlated in close temporal proximity, and whether the events and data come from one or several event and data sources. Various classification (explicitly or implicitly trained) schemes or systems (e.g., support vector machines, neural networks, expert systems, Bayesian belief networks, fuzzy logic, data fusion engines, etc.) can be employed in connection with performing automatic or inferred action in connection with the claimed subject matter.

A classifier can map an input attribute vector, $x=(x1, x2, x3, x4, xn)$, to a confidence that the input belongs to a class, such as by $f(x)=confidence(class)$. Such classification can employ a probabilistic or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, where the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used in this disclosure also is inclusive of statistical regression that is utilized to develop models of priority.

In order to perform the processing of a live video stream, processing platform 122 employs a plurality of services. Services 110 includes a plurality of services for processing videos. A service included in services 110 performs a specific processing task defined in an instruction graph. A workflow for the processing of a video as defined by an instruction graph includes a set of services to process the video. In an aspect, the workflow further separates the set of services into one or more subsets of services. Each of the subsets can be dedicated to processing a copy of the video in different manner. For example, each of the subsets of the services can process a live video stream in a different format, resolution, coding and/or having different display requirement.

Thus based on the instruction graph determined or generated by the control component 106 for a video to be processed, the control component 106 identifies a set of services that will process the video. The control component 106 can also determine parameter values that the respective services will apply to their respective processing of the video, and the order that services will process the video in. The control component 106 may then call the services in the set to process the video. Reference to a service may encompass an instance of the service and vice versa, where appropriate. Similarly, reference to a task may encompass an instance of a service, and vice versa, where appropriate.

In an embodiment, once the control component 106 generates or determines an instruction graph for the processing of a live video stream, the control component 106 can find the set of services to perform the tasks of the processing graph within a shared infrastructure. The shared infrastructure can include a plurality of services that are each configured to perform one or more tasks defined by the instruction graph. According to this embodiment, system 100 (and additional systems described herein) is configured to operate in a shared computing infrastructure. A service can be performed at one or more processors/machines in the shared computing infrastructure. The processors for example can be distributed functionally or geographically in a cloud computing environment. In an aspect, the control component 106 can select the set of services for a particular instruction graph from a plurality of available services such that each service in the set is employed at a different processor. Similarly, the control component 106 can assign different processors in the shared computing infrastructure to perform a different service defined by the instruction graph. Once the control component has selected and/or assigned services in the shared infrastructure, the control component 106 can establish connectivity between these services in accordance with the instruction graph. In response to established connectivity between the services, the control component can trigger data flow amongst them.

In an aspect, the control component 106 selects/finds the set of services defined by an instruction graph from available services in a shared computing infrastructure. Available services can refer to services, or processors associated with those services, which are not busy performing other tasks or jobs in the shared computing infrastructure. For example, an available service can include a service or associated processor, that is not performing any tasks. In another example, an available service can include a service or associated processor that is performing fewer tasks relative to other services/processors in the shared computing infrastructure. Still in yet another embodiment, the control component 106 may determine that services or processors are not available in the shared computing infrastructure to perform tasks of an instruction graph. According to this aspect, the control component 106 is configured to schedule services such that an instruction graph task is performed by a next available service or on a next available processor. Further, the control component 106 is also configured to give priority to services associated with live video processing system 100 in the distributed computing infrastructure. For example, if a processor core in the shared computing infrastructures is being uses for a job not related to live video processing, the control component 106 can cause the processor to put the job on hold to perform a live video processing service instead.

Transcoding component 108 is configured to carry out the execution of services to process a live video stream. In an embodiment, the control component 106 is configured to control the encoding of a live video based on the instruction graph determined or generated for the video. In particular, in an aspect, the control component 106 can direct the transcoding component to call services and ensure that the services are performed in accordance with the instruction graph determined and/or generated by the control component 106. In an aspect, video processing platform 122 can begin processing of a live video stream in response to ingestion of a portion of the live video stream. For example, as discussed above, once a suitable amount of data is ingested, the video processing platform 122 can generate a segment or chunk of the live video stream to begin processing thereof.

Further, in an embodiment, ingestion of a live video stream is performed at the direction of the control component 106 in response to a request for processing of the video. In an aspect, the ingestion and the request may occur at substantially the same time. In another aspect, processing platform may receive another request for a live video stream as ingestion and processing has already begun. In other words, in another aspect, ingestion (via the ingestion component 104) and a request may occur at different times.

As used herein, processing of a live video stream includes the transcoding or encoding of the live video stream. With the subject live transcoding, transcoding component 108 employs the services defined in the instruction graph for a video to be encoded to encode each of the segments or chunks of the live video stream as they are received or generated by the processing platform. In particular, in an aspect, the ingestion component 104 receives portions of the live video stream or segments of the live video stream in a sequence as they are recorded in association with the source 102. The transcoding component 108 is further configured to finish processing of respective ones of the segments in an order of the sequence and the distribution component 112 is configured to stream a segment in response to finishing process of the segment. Therefore, the transcoding component 108 finishes process a segment of the live video stream and the distribution component distributes the processed segment prior to receipt and/or process of all of the segments of the live video stream.

The set of services in an instruction graph define workflows for processing a live video stream and form one or more pipelines consisting of one or more services. A pipeline can include any number of N services where N in an integer. An instruction graph orders services such that each of the segments of a live video stream pass from an upstream service to a downstream service until all services have process the live video segment. A pipeline consists of a subset of the services in a graph and is configured to process a live video stream according to a particular format (e.g. display format, resolution, transmission format, bit rate, coding format, and etc.). In an aspect, an instruction graph can define a plurality pipelines, each associated with a subset of services. Accordingly, processing platform can process copies of a live video stream simultaneously (or substantially at the same time), across different pipelines such that the resulting live video streams can be consumed in a variety of formats at a variety of different client devices.

In an embodiment, a first service is configured to generate a copy of the live video stream. In another aspect, a first or second service is configured to perform chunking of the live video stream. In an aspect, based on an instruction graph, the transcoding component 108 processes a first segment of a live video stream at a first service to completion. Once the first service finishes processing the first segment, the transcoding component 108 can stream the first segment to a second service for processing. In addition, once the first service finishes processing the first segment, the transcoding component 108 streams a second segments to the first service for processing and so on.

According to this embodiment, each of the services in the instruction graph process one logical graph task at a time. Thus in an aspect, the control component 106 (and/or the transcoding component at the direction of the control component 106) can schedule services so that a service in a set processes only one logical instruction graph task at a time. In other words the control component 106 schedules only one service task of a particular instruction graph to be performed at given time by the service. Further, as discussed above, the control component 106 can assign schedule services such that each service is performed at physically distinct processing core. As a result, the affects of a failure and/or unavailability of a service can be substantially isolated. For example, the a failure and/or unavailability of a service can directly affect only a single segment and possibly indirectly affect a few segments coming through the pipeline after the affected segment.

In another embodiment, the control component 106 can schedule the services such that a single segment flows through a subset of services (e.g. a pipeline) at a time. For example, the where a processing pipeline consists of N services, the control component 106 can schedule the services such that a single segment of a live video stream is processed by each of the N services prior to the processing another segment at any of the N services. According to this aspect, the affects of a processing failure at any of the N services can be further isolated.

In another embodiment, based on an instruction graph, the transcoding component 108 directs a first service to process a live video segment as it receives the video segment. The first, service can further process a portion of a video segment. When the first service has processed enough of a first video segment for a second service in the workflow to start processing the first video segment, the first service may notify the control component 106. In response to the notification, the control component 106 may call a second service to process the first video segment. In an aspect, calling the second service may cause the second service to generate an instance of itself specifically for the video.

When the control component 106 calls the second service, the control component 106 may specify one or more parameter values for the second service to apply to its processing of the video segments. In addition, the control component 106 may specify where second service may pull the first video segment from. In an aspect where the second service directly follows downstream the first service in the workflow, the second service may pull the first video segment from first service. The transcoding component 108 may direct the second service to request that the first service start streaming the first video segment to the second service, and in response, the first service may start streaming the first video segment to the second service. Thus the transcoding component 108 can direct the first service to communicate portions of the first video segment to the second service as the first service completes processing of those portions of the first video segment. In an aspect, the first service need not complete processing the first video segment in its entirety before streaming the first video to the second service for processing by second service.

When the second service has processed enough of the first video segment for a third service in the workflow to start processing the video, the second service may notify the control component 106. In response to the notification, the control component 106 may call the third service to process the first video segment. Calling the third service may cause third service to generate an instance of itself specifically for the video. When the control component 106 calls third service, the controller may specify one or more parameter values for the third service to apply to its processing of the first video segment. In addition, the control component may specify where the third service may pull the first video segment from. Where the third service flows directly downstream the second service in the workflow, the third service may pull the first video segment from the second service.

The third service may request the second service to start streaming the first video segment to third service and, in response, the second service may start streaming the first video segment to the third service, communicating portions of the first video segment to the third service as the second service completes its processing of those portions of the first video segment. The second service need not complete processing the first video segment in its entirety before streaming the first video segment to third service for processing by the third service. Moreover, the first service need not complete processing the first video segment in its entirety before the second service starts streaming the first video segment to the third service for processing by the third service. This process of control component 106 calling services based on an instruction graph and services notifying the control component when they have processed enough of the video for downstream processing may continue until the workflow is complete. In an aspect, as the processing of the first video segment completes, the processing platform 122 may store various forms of the first video segment as processed in memory or alternative storage.

In particular embodiments, a first service in a workflow or pipeline is downstream from a second service in the pipeline if first service comes after the second service in the pipeline. A service is immediately downstream from an other service in a pipeline if the service comes directly after the other service in the pipeline. In particular embodiments, a service in a pipeline is upstream from an other service in the pipeline if the service comes before the other service in the pipeline. A service is immediately upstream from an other service in the pipeline if service comes directly before the other service in the pipeline.

Once a video segment has been processed by each of the N services in a subset of services defining a workflow for the video, the processed video segments is distributed to a client. In an aspect, a last service of a workflow or pipeline can be configured to perform distribution of the segments passing therethrough. In another aspect, distribution component 112 distributes processed segments of a live video stream. In an embodiment, distribution component 112 is configured to stream live segments of video to a client. In another embodiment, the distribution component 112 can be affiliated with a CDN 118. According to this embodiment, the distribution component 112 can employ a CDN 118 to facilitate distribution of a live video stream to one or more clients. In an aspect, the distribution component utilizes HLS to distribute live processed segments of a video.

With system 100, (and additional systems described herein), the ingestion component 104 receives segments of a live video, the transcoding component 108 processes the segments, and the distribution component 112 streams the segments, substantially concurrently, thus enabling real-time or near real-time processing of the live video. In particular, in an aspect, the transcoding component 108 employs a subset of services 110 to process a first segment and a second segment and the distribution component 112 streams the first segment to a client device before processing of the second segment is completed. Similarly, in an aspect, the distribution component 112 can stream a first processed segment of a live video stream to a device before processing of a second segment of the live video stream by a second service.

Processing platform 122 is designed to operate in a shared computing infrastructure on general purpose servers and networks that are broadly optimized across a wide array of applications, as opposed to tightly optimized to narrow and specific set of applications. Processing platform 122 can employ several mechanisms to overcome performance and reliability challenges posed in a shared computing infrastructure in exchange for benefiting from numerous economies of scale provided by such an environment, in terms of hardware costs, operational costs, and opportunity costs related to elasticity or agility of deployment. System 100 can process any number N of live vides at a time of variable sizes and at variable qualities.

In an aspect, system 100 is configured to process a fewer number of videos at a time than non-live video processing systems in order to ensure a level of reliability desired with respect to live video processing. In an aspect, system 100 processes live videos corresponding to events of a relatively longer duration than non-live video processing systems. For example, a live video may correspond to an event in durations of hours. However, processing platform can also process live video corresponding to events having shorter durations, such as events in durations of minutes. Further, in an aspect, system 100 processes videos in a higher quality (e.g. 1080p) than non-live video processing systems.

At a resource management level, processing platform can apply several mechanisms to enhance the predictability of service performance in a shared computing infrastructure. One mechanism includes restricting logical service to physical compute task mappings. This mechanism moves away from multiplexing logical service components of instruction graphs onto individual physical job tasks. In other words, this mechanism provides a single slot regime such that job scheduling constraints that assure that a single physical task will only process one logical graph task at a time.

Components of video processing platform 122 may be distributed across such servers or other computer systems according to any suitable arrangement. Each server may be a unitary server or distributed server spanning multiple computer systems or multiple datacenters, according to particular needs. In an embodiment, processing platform 122 can apply constraints to ensure that physical cores assigned to live video processing tasks are reserved to the exclusion of other jobs present in the shared infrastructure. In particular, the ingestion component 104, the control component 106, the transcoding component 108, and the distribution component 112 operate in a shared processing infrastructure. Processing platform 122 can be designed such that physical processing cores of the shared processing infrastructure perform the tasks of ingestion, transcoding, and distribution at the exclusion of other jobs present in a shared processing infrastructure. For example, physical processing cores of the transcoding component, such as those associated with respective services, can configured or scheduled (by control component) to perform the processing task for an instruction graph prior to performing other jobs (not associated with live video processing) in the shared infrastructure. This trades off between more a deterministic performance and a relatively lower overall resource utilization and is appropriate to the context of live broadcasting.

Figure 3:
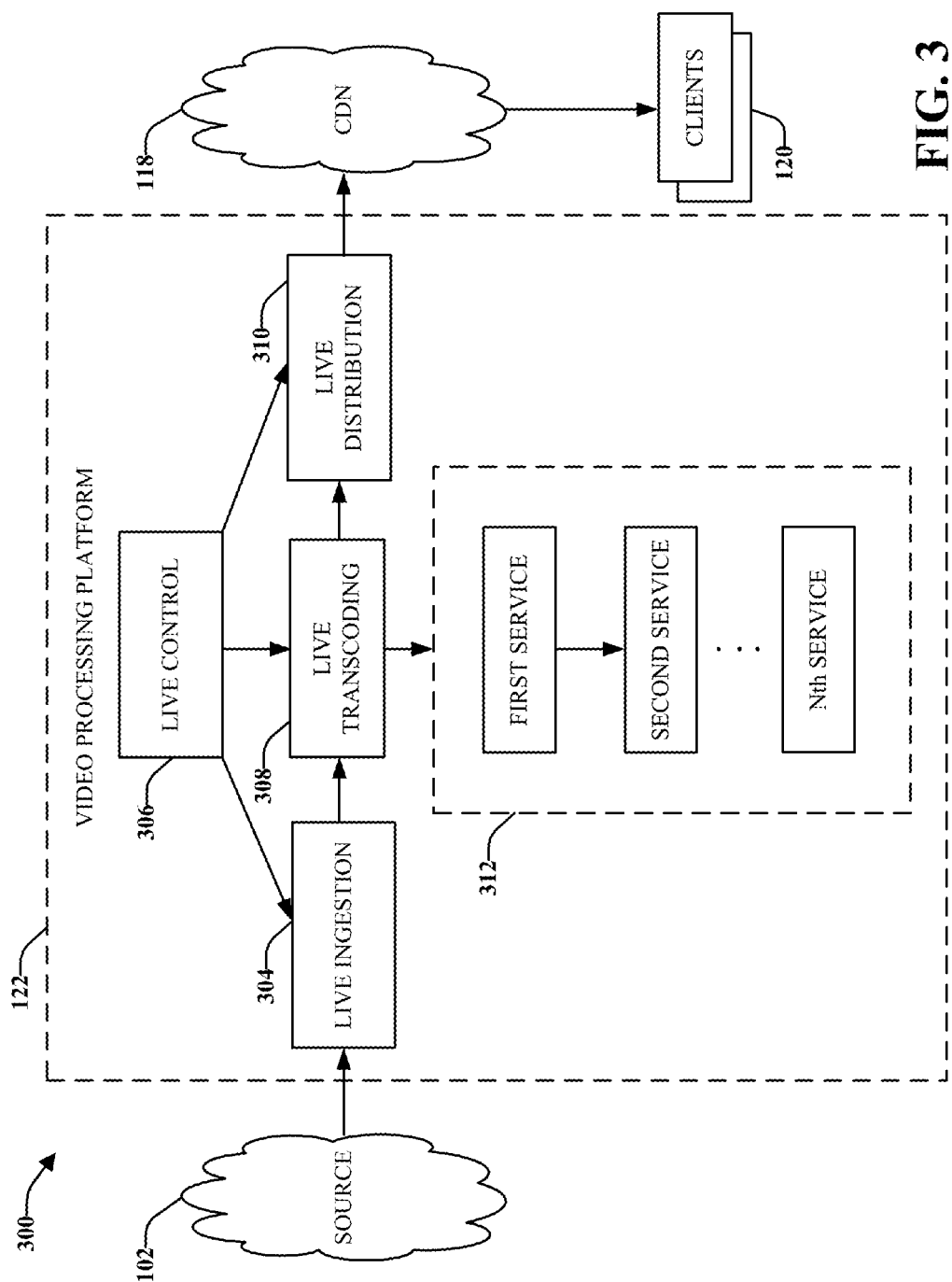
FIG. 3 illustrates an example of a non-limiting flow diagram that depicts the processing flow of a live video processing system in accordance with various aspects and implementations described herein.

Referring now to FIG. 3, presented is an exemplary non-limiting flow diagram that depicts the processing flow of a live video processing system in accordance with an embodiment. Processing of a live video stream can begin with a request to process a live video stream. In an aspect, the request can originate from a source 102 providing the live video stream to the processing platform 122. A source 102 provides a live video stream and processing platform performs live ingestion 304 of the live video stream. For example, ingestion component 104 can ingest segments of video as they are received. Once a live video stream is ingested, video processing platform performs live transcoding 308. In an aspect, live transcoding 308 can involve processing of video segments as they are received. In another aspect, live transcoding 308 can involve generating segments of video from a live video stream as it is received and processing the generated segments. Live transcoding 308 comprises processing the live video segments through a pipeline 312 of a services. The pipeline 312 of services can comprises of any number N services. Once a video segment is processed at an the Nth service, the video processing platform 122 performs live distribution 310 of the processed video segment. For example, the live distribution component 310 can employ HLS to distribute processed live video segments to a CDN 118 which in turn can distribute the live video segments to one or more clients. In an aspect, the control component 106 performs live control 306 of each of the aspects of live video processing, including live ingestion 304, live transcoding 308, and live distribution 310

With the subject live video processing systems and methods disclosed herein, live ingestion 304, live transcoding 308 and live distribution 310 are performed substantially concurrently. In an aspect, live ingestion 304, live transcoding 308 and live distribution 310 are performed within less than one nanosecond lag between the respective acts of receipt, encoding, and distribution. In another aspect, live ingestion 304, live transcoding 308 and live distribution 310 are performed within less than one millisecond lag between the respective acts of receipt, execution, and distribution. Still, in yet another aspect, live ingestion 304, live transcoding 308 and live distribution 310 are performed within less than one picosecond lag between the respective acts of receipt, execution, and distribution. In other words, the ingestion component can ingests the segments and the distribution component can stream the segments within one of, less than one nanosecond less than one millisecond, or less than one picosecond.

Figure 4:
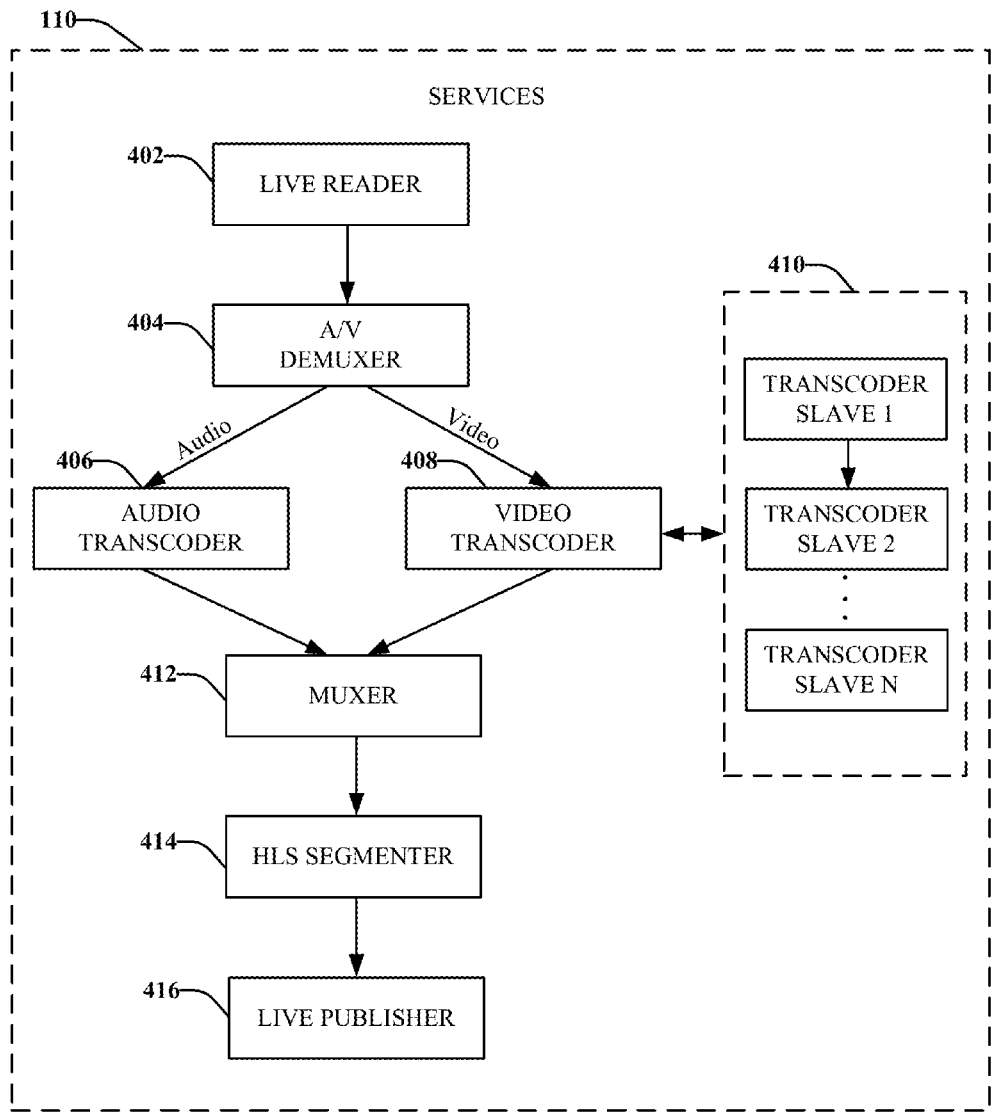
FIG. 4 illustrates an example of a non-limiting diagram of a data workflow comprising a pipeline of services in accordance with an embodiment in accordance with various aspects and implementations described herein.

Referring now to FIG. 4, presented is an exemplary non-limiting flow diagram of a data workflow comprising a pipeline of services 402-416 associated with services component 110 of live video processing system 100 in accordance with an embodiment. Each of the services 402-416 are configured to perform specific processing tasks. As depicted in FIG. 4, service 402 is the first service in the processing pipeline and service 416 is the last service in the processing pipeline. Further, service 404 is downstream of service 402, service 406 is downstream of service 404, and so on. Each of the services 402-414 are configured to process a video segment and stream the processed segment to the next downstream service for processing.

In an aspect, live reader service 402 reads an input stream from the ingestion component 104 using the input live stream VID. In another aspect, the live reader service 402 can also receive the requests for processing of a live video stream. The audio/video (A/V) demuxer service 404 is configured to split an input stream into separate audio and video streams and sanitize the input stream. Audio transcoder service 406 is configured to trancode the audio stream into a target audio format. Video transcoder service 408 is configured to transcode the video stream into a target video format. Muxer service 412 is configure to mux or combine the audio and video stream together. HLS segmenter service 414 gets the output video stream from the muxer and creates one or more encrypted HLS segments form of the video stream. Live publisher service 416 outputs the HLS segments to distribution component 112. In an aspect, the live publisher sends the distribution component metadata along with the HLS segments. The metadata can provide information about the HLS segments such as real timestamp range of the segments and/or a key to decrypt the segments.

In an aspect, the video transcoder 408 can employ one or more slave video transcoders 410 to facilitate transcoding a live video stream. Slave transcoders can provide a parallel transcoding scheme that facilitates real-time or near real time processing of a video stream. According to this aspect, video transcoder 408 can divide a video stream (or a first segment or first chunk of a live video stream) into a plurality of chunks and employ a group of slave transcoders to process each of the chunks in parallel. The video transcoder 408 can then combine the transcoded chunks prior to muxing or the muxer 414 can combine the transcoded chunks. As a result, transcoding speed of the video stream can be increased. One or more of the slave transcoders can be provided on a same processor machine or each of the slave transcoders can be provided on separate processor machines.

Figure 5:
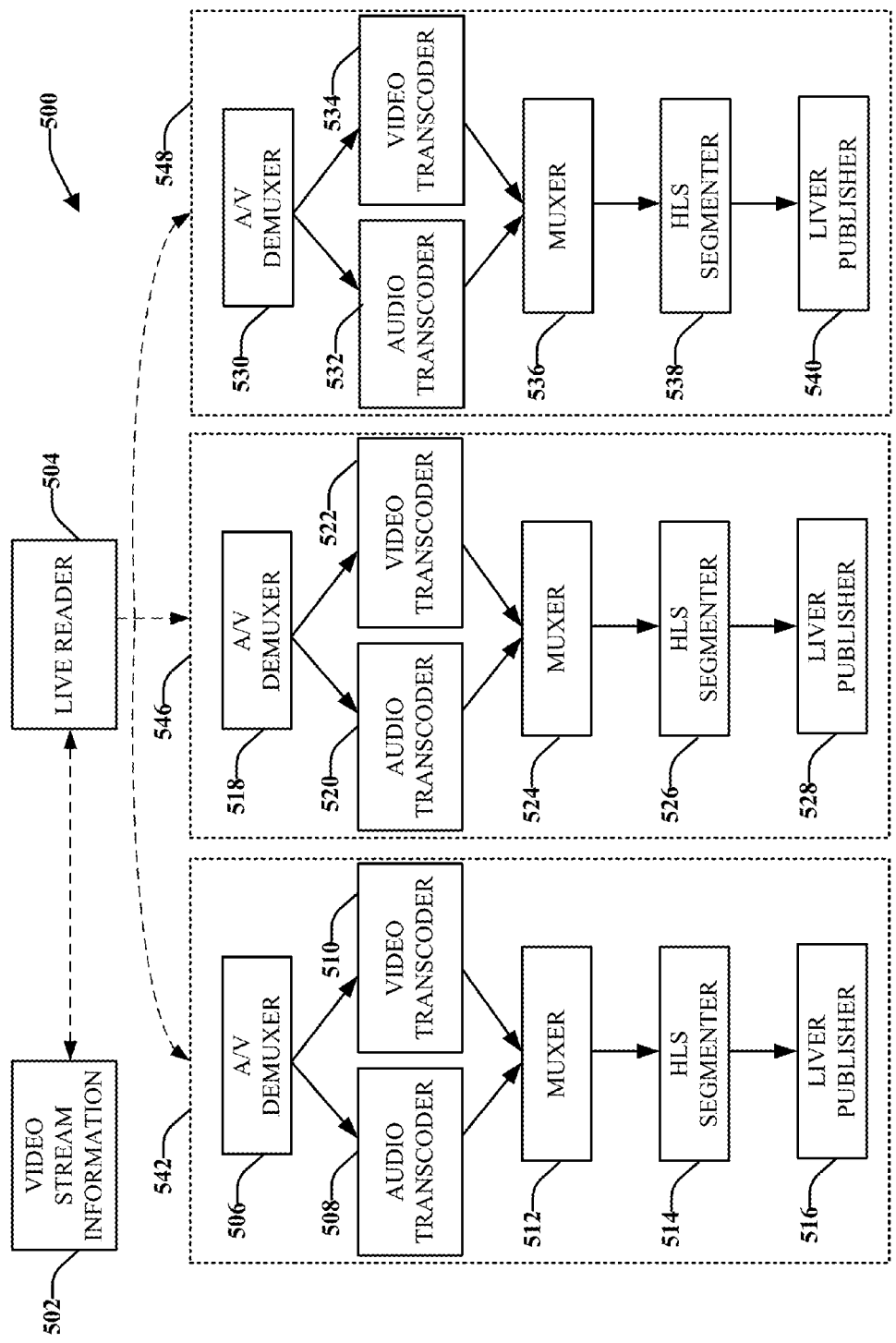
FIG. 5 illustrates an example of a non-limiting instruction graph defining a workflow for processing a live video stream in accordance with various aspects and implementations described herein.

With reference to FIG. 5, presented is an example instruction graph 500 defining a workflow for processing a live video stream in accordance with an embodiment. The instruction graph defines three different pipelines 542, 546, and 548. It should be appreciated that instruction graphs can define any number N of pipelines, and that instruction graph 500 is presented with three pipelines merely for exemplary purposes. Each of the pipelines 542, 546 and 548 can further include live reader 504 as a first service. In an aspect, the live reader generates copies of a received live video stream for processing at each of the pipelines. In another aspect, a plurality of copies of the live video stream are accessible to the live reader 504 in association with video stream information 502. According to this aspect, each of the pipelines 542, 546, and 548 can be streamed a copy of the live video stream to be processed from the live reader.

Each of the pipelines 542, 546, and 548 comprises services that are configured to process a live video stream in a specific format. For example, pipeline 542 includes services 506-516, pipeline 546 includes services 518 through 528, and pipeline 548 includes services 530-540. Each of the services of the respective pipelines can be configured to process a live video stream in a different format. For example, the services of pipeline 542 may process a live video stream in 720P, the services of pipeline 546 may process a live video stream in 1080P, and the services of pipeline 548 may process a live video stream in high definition. It should be appreciated that a variety of additional formatting outputs can be associated with services and pipelines in accordance with additional embodiments.

An instruction graph, such as instruction graph 500 may be tangible computer-readable instructions describing a workflow for processing a video. In an aspect, instruction graph 500 may include service descriptions. Each service description may identify a service and its parameter or format values for the workflow described by instruction graph. In an aspect, service descriptions can further define relationships and dependencies between services. In another aspect, parameter values and or dependencies of the processing carried out by a service may be inherent to that service. As a result, a description of that service may include few parameters. In particular embodiments, one or more portions of instruction graph 500 (and the workflow it describes) may be nonlinear. A nonlinear workflow may include one or more services that each have multiple dependencies. Similarly, a nonlinear workflow may split at one or more points into two or more services that may run substantially parallel to each other (e.g. slave stranscoders).

Figure 6:
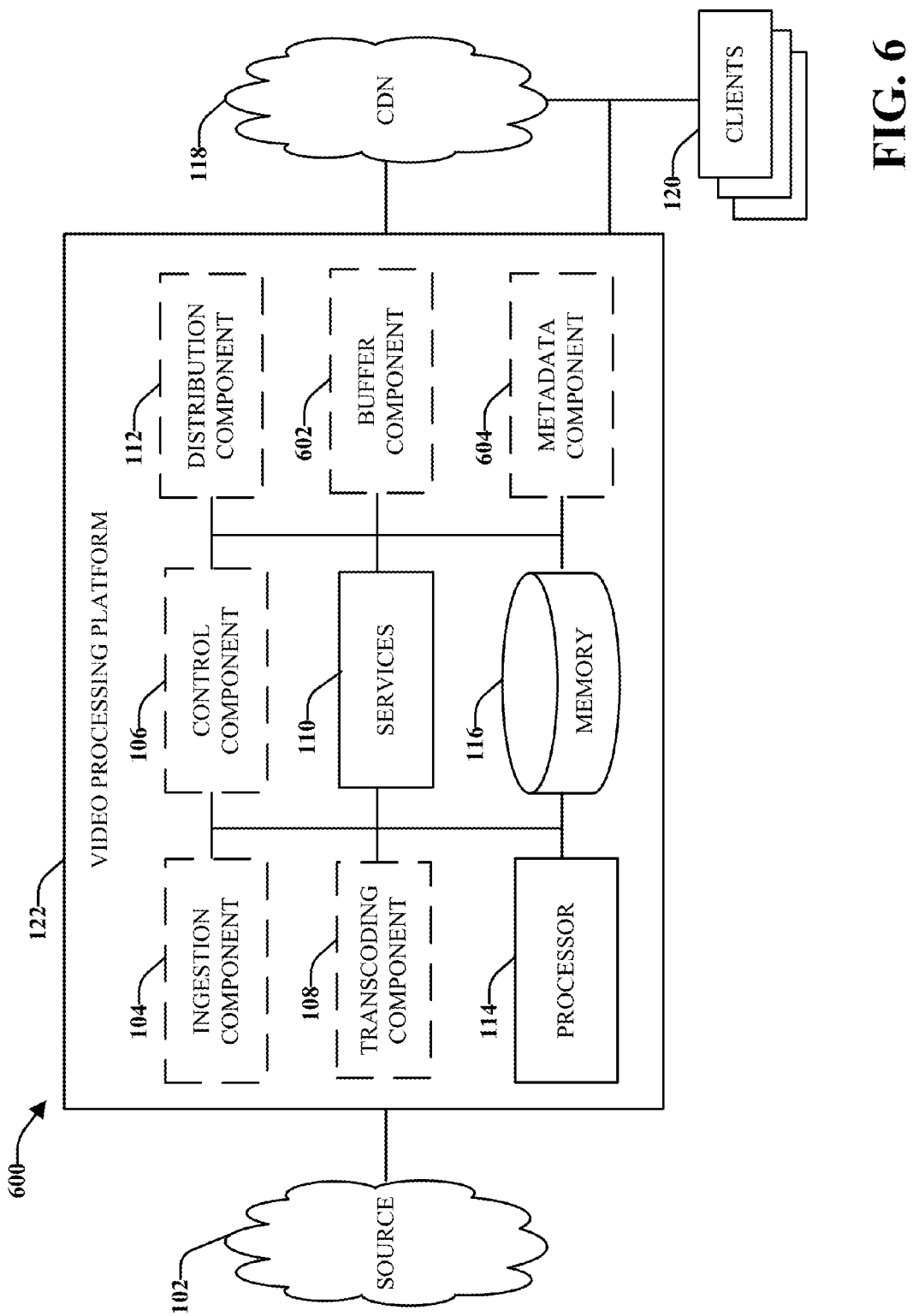
FIG. 6 illustrates another example non-limiting live video processing system that facilitates processing of live video streams for live video broadcasts in accordance with various aspects and implementations described herein.

Referring now to FIG. 6, presented is another exemplary non-limiting embodiment of live video processing system 600 in accordance with an embodiment. System 600 can include buffer component 602 and metadata component 604. In an aspect, buffer component and metadata component are storage components. According to this aspect, (although not depicted as such) buffer component 602 and/or metadata component 604, can be part of memory 116 and/or another storage component accessible to processing platform 122. Buffer component 602 is configured to temporarily store the output of a service in a processing pipeline in one or more inter-service buffers for a predefined window of time associated with the processing of the segment. In particular, buffer component 602 temporarily stores an instance of a live video segments as it exists in a state in between two or more services for predefined window of time. Buffers referred to herein are thus considered windowed buffers. The windowed buffers of system 600 facilitate a retry or reprocessing mechanism in response to processing failures associated with services in a pipeline suitable for live video processing. In addition, windowed buffers additionally provide a means to seamlessly join service outputs that are out of synchronization due to different processing speeds of different services and associated processors assigned to an instruction graph. For example, different services may consume and produce data in a somewhat fluctuating fashion. Windowed buffers can serve to cushion this variance.

Unlike non-live video processing systems, buffers employed by system 600 are based in primary memory. In non-live video processing systems, output buffers between services are backed by file so that downstream services can retry on soft failures. This is inappropriate in live setting. First, in a live event, it does not make sense to go back to the beginning of the event on any failure (e.g. if the event is already more than an hour old) because the beginning of event has already been processed and streamed to a client for live viewing. Second, because live events are relatively long large storage requirements potentially have a negative impact on system constraints. Finally, memory based buffers are more predictable with respect to performance than files, as performance of shared secondary storage generally has much higher variability (lower isolation). Assured performance facilitates maintaining substantially real-time progress in processing a live video.

Live video processing system 600 employs a windowed buffer model between services. The windowed model ensures a finite amount of primary memory is used by inter-service buffers. The word window refers to a sliding window concept. In particular, with a subject inter-service windowed buffer, as new data is written to the buffers, older data can be discarded to ensure the RAM capacity of the buffer is not exceeded. System 600 employs windowed buffers to temporarily stores the segments of the live video stream as they are processed between services for a predefined window of time. The predefined window of time can be any amount of time that is appropriate for live video processing. In an aspect, the predefined window of time is less than 5 minutes. In another aspect, the predefined window of time is less than 3 minutes. In yet another aspect, the predefined window of time is less than one minute, 45 seconds, or 30 seconds.

Due to the assumption of the finite window, the windowed buffers implement a new logic form for service retries in the case of processing failures, which allow a service to gracefully join mid-way into an ongoing stream after a retry event. For example, when a processing failure occurs in a downstream service occurs, the live video processing system may retry the service by restarting it from a current point of the video stream. A processing failure can include any error in processing. For example a processing failure can be associated with a hardware failure associated with a processor at which a service is employ, or operational events such as evictions or kernel upgrades.

In an embodiment, the control component 106 oversees retries or reprocessing of video segments in accordance with an instruction graph in response to an occurrence of a retry event. A retry event refers to the reprocessing or rerunning (through a pipeline) of video segments in response to a processing failure. In an aspect, in order to facilitate efficient retries appropriate for live video processing, the control component 106 defines each subset of services (e.g. each of the services in a pipeline) of set of services in a workflow as a retry group. According to this aspect, when a processing failure is associated with any of the services in a retry group, only the subset of services of the retry group are retried. Therefore, where multiple subsets or pipelines are defined by an instruction graph, only the pipeline associated with the failure is retied. In another words, a failure in one processing format can be isolated from the others. Although some non-live processing systems have the support to propagate retries from upstream downward in a graph, the retry groups of live processing systems disclosed herein adds the ability for some failures to propagate both downward and upward (from downstream to upstream). One advantage of retry groups is simplification. For example, any service logic to handle a retry case is restricted to the "root" node of the group. Another advantage is isolation, the retry groups limit the impact of a failure.

For example, in an aspect, the transcoding component 108 can employ a subset of the services (e.g. a pipeline) to process a plurality of segment of a live video stream based on an instruction graph for the live video stream. The live video stream can comprise of any number of N segments where N is an integer. Assuming the encoding platform is processing any segment N at a time through a subset of services (where in this example, the Nth segment is not necessarily the last segment), in response to a processing failure associated with any of the services in the subset, the transcoding component 108 can employ the subset of the services to reprocess the Nth segment.

In an aspect, where a processing failure is associated with a hardware failure at which a service in the subset is employed, the control component 106 can direct the transcoding component 108 to reprocess the Nth segment by employing at least one of the services in the subset using a new physical processor. Further, if the transcoding component cannot reprocess an effected segment within a predetermined window of time, the transcoding component 108 can abandon the retry process and proceed with the next segment of the live video stream. For example, the transcoding component can then employ the subset of services to process an Mth segment of the live video stream in response to a failure to reprocess the Nth segment within a predefined period of time, wherein M is an integer greater than N.

Metadata component 604 may include one or more databases or other systems for storing metadata for a live video being processed or to be processed by video processing system 600. In particular embodiments, video metadata storage stores only video metadata useful for video processing. As an example and not by way of limitation, video metadata storage 604 may store video metadata for a video indicating a source of the video, a client associated with the video, a location of the video, a size of the video in terms of bytes, a length of the video in terms of time, e.g., hours, minutes, and seconds. In addition, metadata can include timestamps associated with video segments and keys for decryption of the segments. The present disclosure contemplates video metadata storage component 604 storing any suitable video metadata useful for video processing. Further, all components of system 600 can have access to video metadata in metadata component, 604.

Input to and output from video metadata storage may be puts and gets, respectively. In an aspect, video metadata storage may record a processing history of a video over time. As an example and not by way of limitation, video processing platform 122 may process multiple videos, from multiple sources, in multiple formats, and for multiple clients over time. In an aspect, video metadata component may record, information related to such video processing over time. Video processing history of the video may be useful to control component when generating instruction graphs for new videos.

Figure 7:
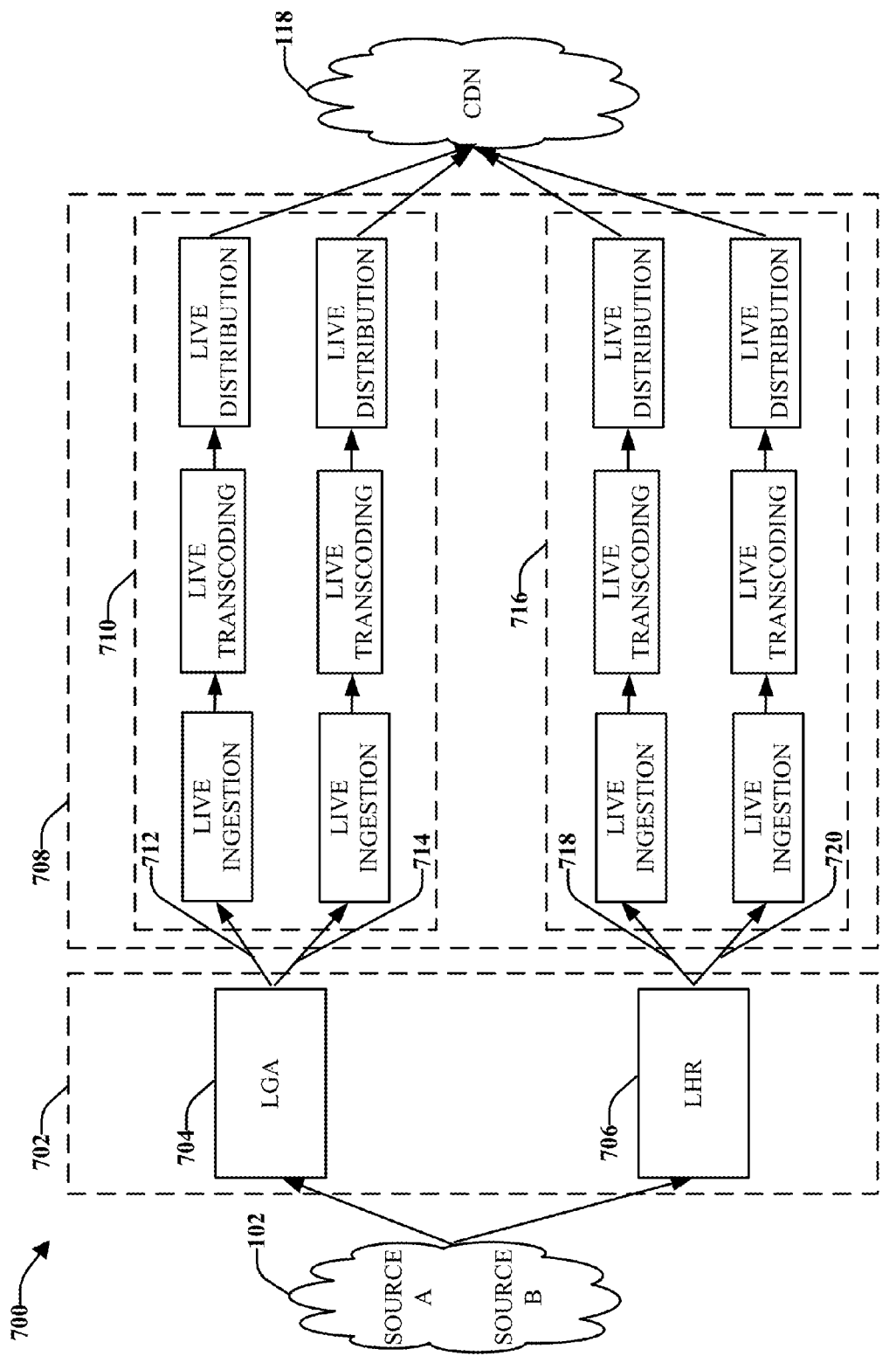
FIG. 7 illustrates a non-limiting embodiment of a high level flow diagram of live video processing in accordance with various aspects and implementations described herein.

With reference to FIG. 7, presented is another exemplary non-limiting embodiment of a high level flow diagram 700 of live video processing in accordance with one or more embodiments disclosed herein. FIG. 7 depicts the flow of live video processing of a live video from a source to a CDN 118 via a live processing platform 708. The live processing platform 708 includes two autonomous live pipelines running concurrently for redundancy, pipeline 710 and pipeline 716 respectively. The two pipelines 710 and 716 respectively correspond to separate video streams originating from two different locations 702. In particular, the pipeline 710 corresponds to ingested video streams from LGA 714 (New York) and the pipeline 716 corresponds to ingested video streams form LHR 706 (London). Further, at each of the locations, two video streams are ingested, one for source A and one for source B. Each of these ingestion points 704 and 706 are then subjected to live processing via processing platform. Pipeline 710 comprises two secondary pipelines, one for the processing of the video stream for source A 712, and another for the processing of the video stream for source B 714. Similarly pipeline 716 comprises two secondary pipelines, one for the processing of the video stream for source A 718, and another for the processing of the video stream for source B 720. In an aspect, each of the pipelines 710-720 can be colocated in the same cluster. In an aspect, one of the pipelines 710 or 716 are marked as primary and the other as backup. In another aspect, one of the pipelines 712 or 714 are marked as primary and the other as backup. Similarly, one of the pipelines 718 or 720 are marked as primary and the other as backup. In an embodiment, if anything goes wrong with a primary pipeline (e.g. ingestion problems, encoding slowing down, fiber cut, etc. . . . ), the live distribution component/system will automatically switch from primary to backup.

Figure 8:
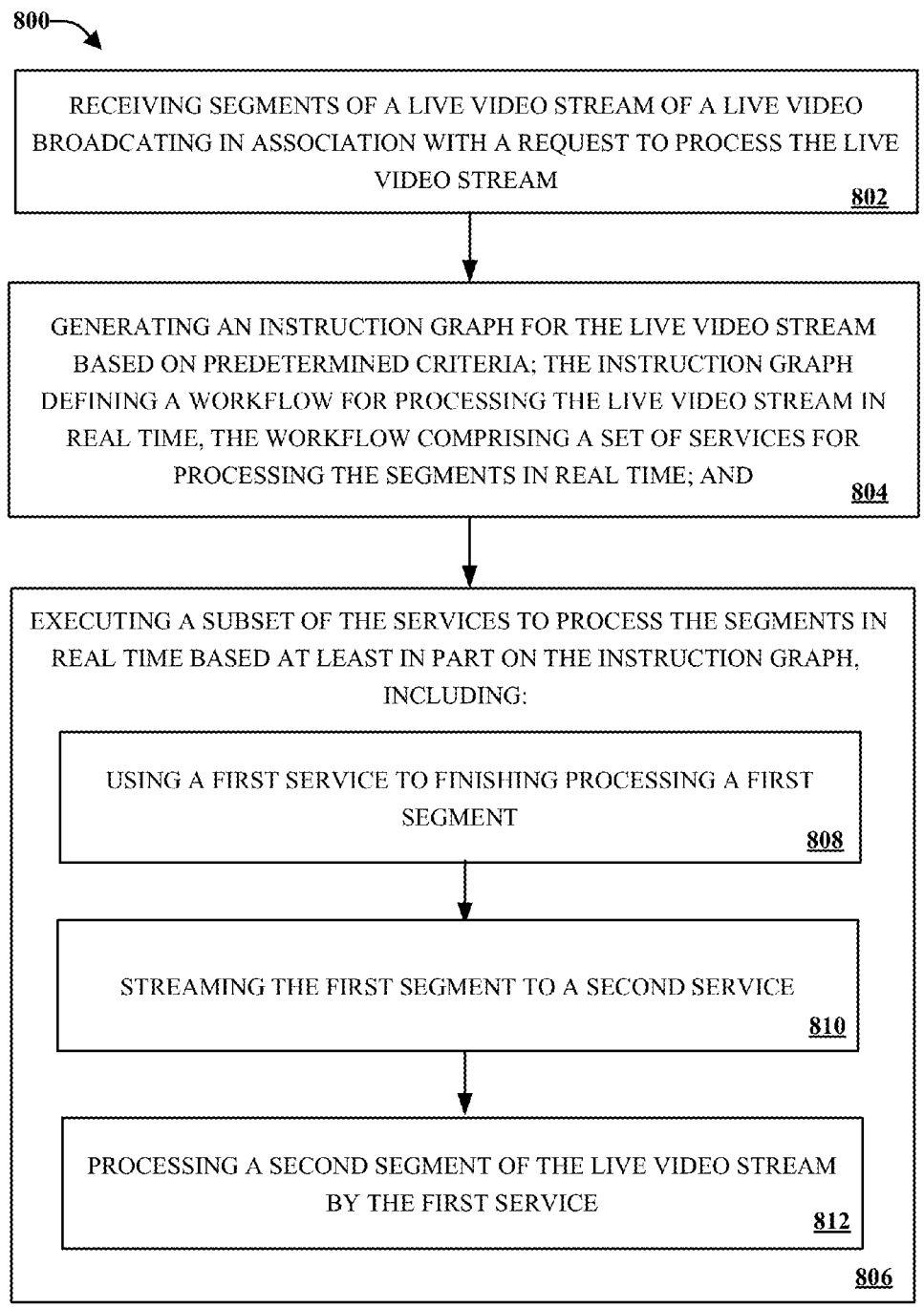
FIG. 8 illustrates an example methodology for processing a live video stream in accordance with various aspects and implementations described herein.
Figure 9:
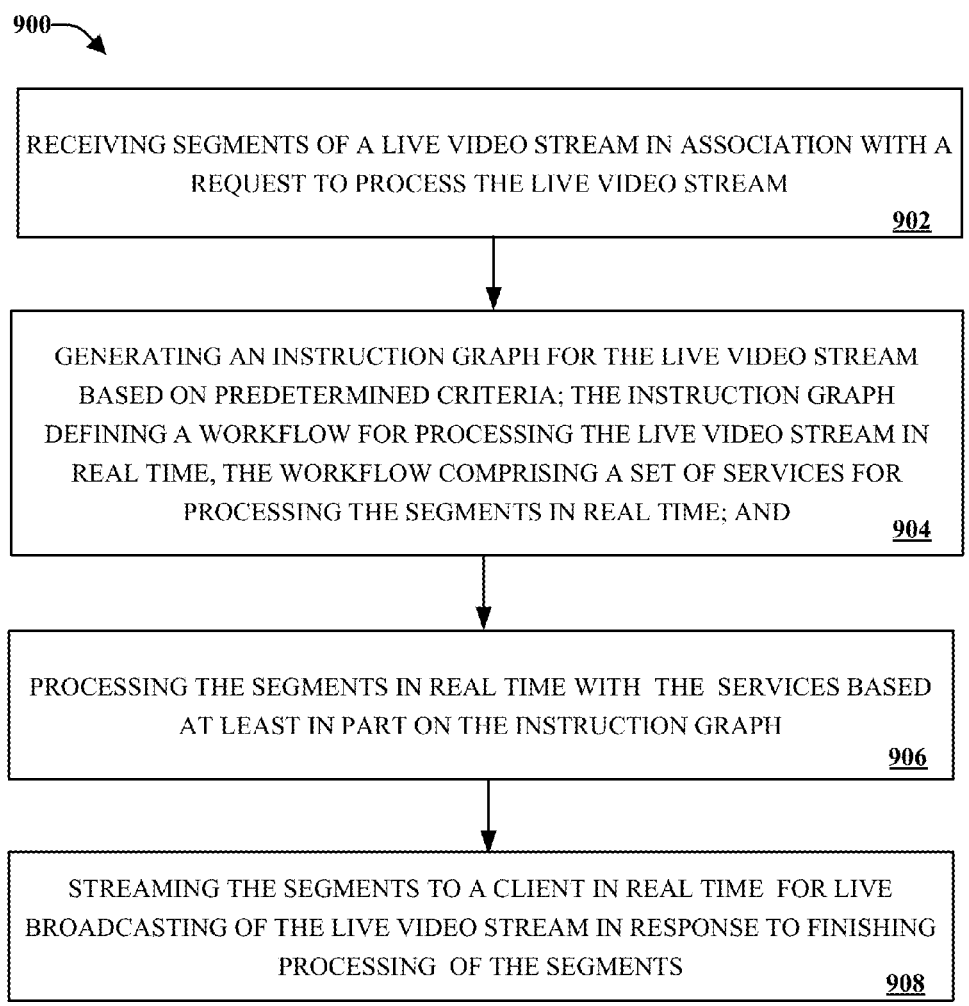
FIG. 9 illustrates another example methodology for processing a live video stream in accordance with various aspects and implementations described herein
Figure 10:
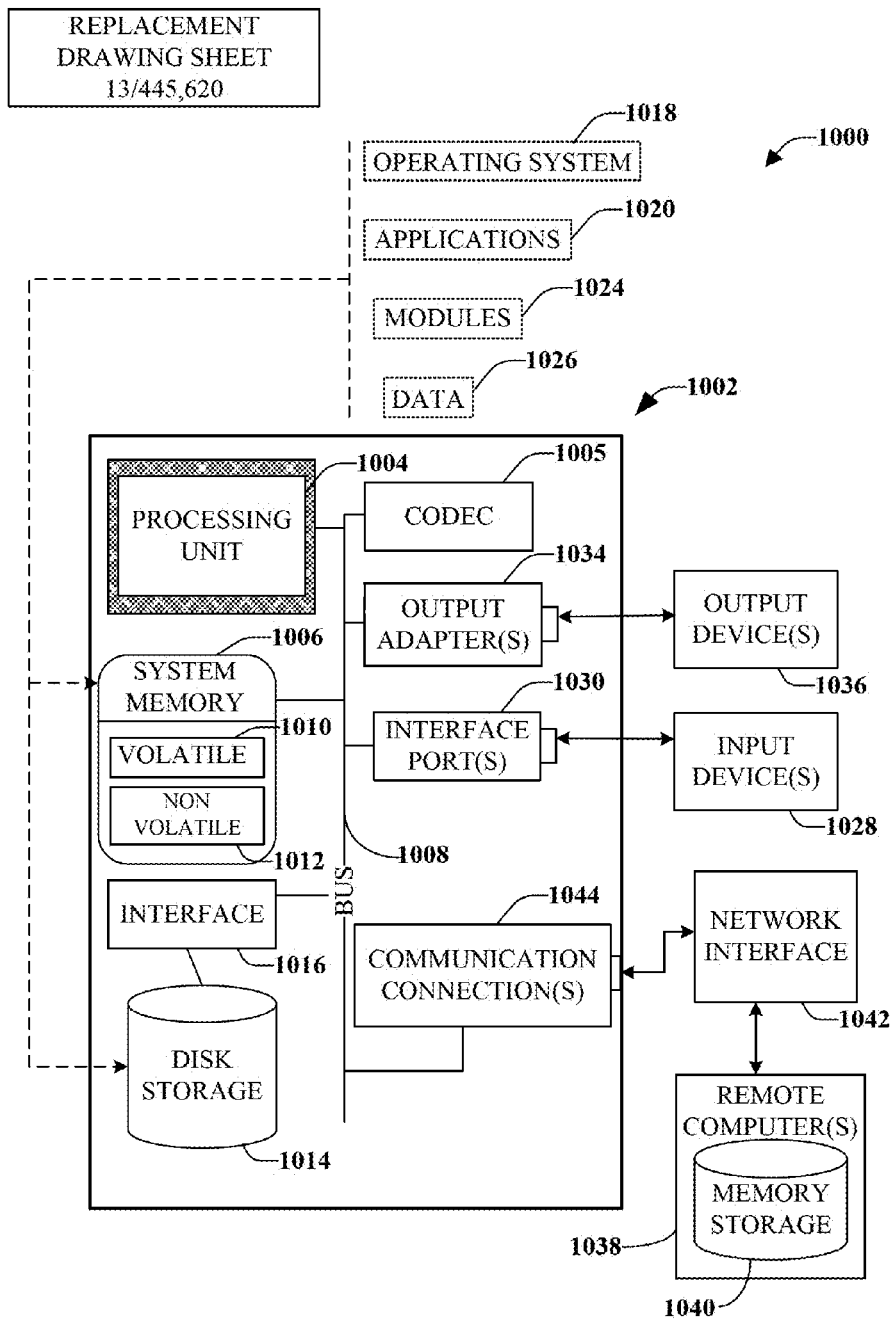
FIG. 10 is a block diagram representing an exemplary non-limiting networked environment in which various embodiments can be implemented in accordance with various aspects and implementations described herein.

FIGS. 8-10 illustrates methodologies or flow diagrams in accordance with certain aspects of this disclosure. While, for purposes of simplicity of explanation, the methodologies are shown and described as a series of acts, the disclosed subject matter is not limited by the order of acts, as some acts may occur in different orders and/or concurrently with other acts from that shown and described herein. For example, those skilled in the art will understand and appreciate that a methodology can alternatively be represented as a series of interrelated states or events, such as in a state diagram. Moreover, not all illustrated acts may be required to implement a methodology in accordance with the disclosed subject matter. Additionally, it is to be appreciated that the methodologies disclosed in this disclosure are capable of being stored on an article of manufacture to facilitate transporting and transferring such methodologies to computers or other computing devices.

Referring now to FIG. 8, presented is a flow diagram of an example application of systems disclosed in this description accordance with an embodiment. In an aspect, exemplary methodology 800, a live video processing system is stored in a memory and utilizes a processor to execute computer executable instructions to perform functions. At 802 segments of a live video stream of a live video broadcasting are received in association with a request to process the live video stream (e.g. using inception component 104). At 804 an instruction graph is generated for the live video stream based on predetermined criteria (e.g. using control component). The instruction graph defines a workflow for processing the live video stream in real time and comprises a set of services for processing the segments. Then at 806 a subset (e.g. a pipeline) of the services are executed to process the segments in real time based at least in part on the instruction graph (e.g. using execution component 108). Execution of the subset of the services can further include the following process: at 808, a first service is used to finish processing of a first segment, at 810, the first segment is streamed to a second service, and at

812, a second segment of the live video stream is processed by the first service (e.g. using execution component 108).

Referring now to FIG. 9, presented is another flow diagram 900 of an example application of systems disclosed in this description accordance with an embodiment. In an aspect, exemplary methodology 900, a live video processing system is stored in a memory and utilizes a processor to execute computer executable instructions to perform functions. At 902 segments of a live video stream are received in association with a request to process the live video stream (e.g. using inception component 104). At 904 an instruction graph is generated for the live video stream based on predetermined criteria (e.g. using control component). The instruction graph defines a workflow for processing the live video stream in real time and comprises a set of services for processing the segments in real time. Then at 906, the segments are processed in real time based at least in part on the instruction graph (e.g. using control component 106 and/or execution component 108). At 908, the segments are streamed to a client in real time for live broadcasting of the live video stream in response to finishing process of the segments.

In view of the exemplary systems described above, methodologies that may be implemented in accordance with the described subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described in this disclosure. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described in this disclosure, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described in this disclosure, and similarly, storage can be effected across a plurality of devices. Accordingly, the invention is not to be limited to any single embodiment, but rather can be construed in breadth, spirit and scope in accordance with the appended claims.

Example Operating Environments

The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which may be explicitly illustrated in this disclosure.

With reference to FIG. 10, a suitable environment 1000 for implementing various aspects of the claimed subject matter includes a computer 1002. The computer 1002 includes a processing unit 1004, a system memory 1006, a codec 1005, and a system bus 1008. In an aspect, processing unit 1004 and system memory 1006 can represent processor 114 and memory 116 respectively. The system bus 1008 couples system components including, but not limited to, the system memory 1006 to the processing unit 1004. The processing unit 1004 can be any of various available processors. Dual microprocessors and other multiprocessor architectures also can be employed as the processing unit 1004. Further, processing unit 1004 can include multiple processors associated with a multi-core processing machine. Processor 114 can represent one or more processors of a multi-core processing machine. Thus components described in association with computing environment 1000 can be associated with one or more multi-core processors in a shared computing infrastructure.

The system bus 1008 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 13104), and Small Computer Systems Interface (SCSI).

The system memory 1006 includes volatile memory 1010 and non-volatile memory 1012. The basic input/output system (BIOS), containing the basic routines to transfer information between elements within the computer 1002, such as during start-up, is stored in non-volatile memory 1012. In addition, according to present innovations, codec 1005 may include at least one of an encoder or decoder, wherein the at least one of an encoder or decoder may consist of hardware, a combination of hardware and software, or software. Although, codec 1005 is depicted as a separate component, codec 1005 may be contained within non-volatile memory 1012. By way of illustration, and not limitation, non-volatile memory 1012 can include read only memory (ROM), programmable ROM (PROM), electrically programmable ROM (EPROM), electrically erasable programmable ROM (EEPROM), or flash memory. Volatile memory 1010 includes random access memory (RAM), which acts as external cache memory. According to present aspects, the volatile memory may store the write operation retry logic (not shown in FIG. 10) and the like. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM.

Computer 1002 may also include removable/non-removable, volatile/non-volatile computer storage medium. FIG. 10 illustrates, for example, disk storage 1014. Disk storage 1014 includes, but is not limited to, devices like a magnetic disk drive, solid state disk (SSD) floppy disk drive, tape drive, Jaz drive, Zip drive, LS-70 drive, flash memory card, or memory stick. In addition, disk storage 1014 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1014 to the system bus 1008, a removable or non-removable interface is typically used, such as interface 1016.

It is to be appreciated that FIG. 10 describes software that acts as an intermediary between users and the basic computer resources described in the suitable operating environment 1000. Such software includes an operating system 1018. Operating system 1018, which can be stored on disk storage 1014, acts to control and allocate resources of the computer system 1002. Applications 1020 take advantage of the management of resources by operating system 718 through program modules 1024, and program data 1026, such as the boot/shutdown transaction table and the like, stored either in system memory 1006 or on disk storage 1014. It is to be appreciated that the claimed subject matter can be implemented with various operating systems or combinations of operating systems.

A user enters commands or information into the computer 1002 through input device(s) 1028. Input devices 1028 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1004 through the system bus 1008 via interface port(s) 1030. Interface port(s) 1030 include, for example, a serial port, a parallel port, a game port, and a universal serial bus (USB). Output device(s) 1036 use some of the same type of ports as input device(s) 1028. Thus, for example, a USB port may be used to provide input to computer 1002, and to output information from computer 1002 to an output device 1036. Output adapter 1034 is provided to illustrate that there are some output devices 1036 like monitors, speakers, and printers, among other output devices 1036, which require special adapters. The output adapters 1034 include, by way of illustration and not limitation, video and sound cards that provide a means of connection between the output device 1036 and the system bus 1008. It should be noted that other devices and/or systems of devices provide both input and output capabilities such as remote computer(s) 1038.

Computer 1002 can operate in a networked environment using logical connections to one or more remote computers, such as remote computer(s) 1038. The remote computer(s) 1038 can be a personal computer, a server, a router, a network PC, a workstation, a microprocessor based appliance, a peer device, a smart phone, a tablet, or other network node, and typically includes many of the elements described relative to computer 1002. For purposes of brevity, only a memory storage device 1040 is illustrated with remote computer(s) 1038. Remote computer(s) 1038 is logically connected to computer 1002 through a network interface 1042 and then connected via communication connection(s) 1044. Network interface 1042 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1044 refers to the hardware/software employed to connect the network interface 1042 to the bus 1008. While communication connection 1044 is shown for illustrative clarity inside computer 1002, it can also be external to computer 1002. The hardware/software necessary for connection to the network interface 1042 includes, for exemplary purposes only, internal and external technologies such as, modems including regular telephone grade modems, cable modems and DSL modems, ISDN adapters, and wired and wireless Ethernet cards, hubs, and routers.

Figure 11:
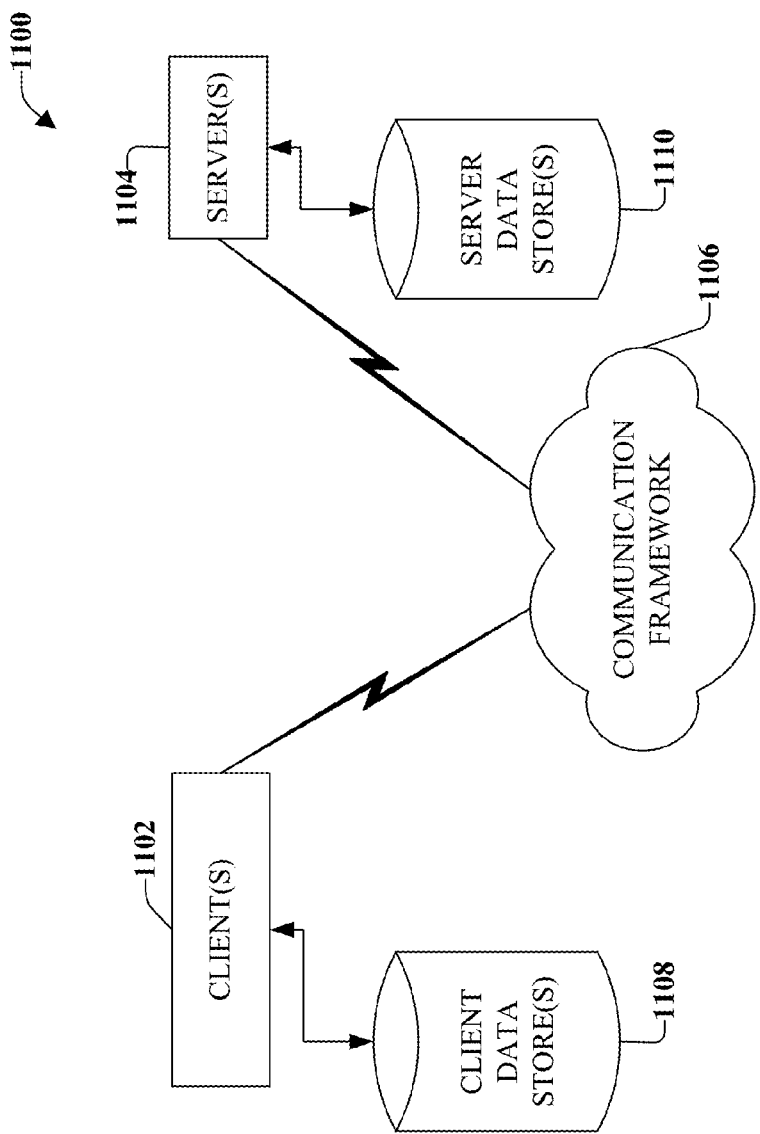
FIG. 11 is a block diagram representing an exemplary non-limiting computing system or operating environment in which various embodiments may be implemented in accordance with various aspects and implementations described herein.

Referring now to FIG. 11, there is illustrated a schematic block diagram of a computing environment 1100 in accordance with this disclosure. The system 1100 includes one or more client(s) 1102 (e.g., laptops, smart phones, PDAs, media players, computers, portable electronic devices, tablets, and the like). System 1100 can for example be employed in connection with implementing one or more of the systems or component described herein show in FIG. 1 and FIG. 6. The client(s) 1102 can be hardware and/or software (e.g., threads, processes, computing devices). The system 1100 also includes one or more server(s) 1104. The server(s) 1104 can also be hardware or hardware in combination with software (e.g., threads, processes, computing devices). The servers 1104 can house threads to perform transformations by employing aspects of this disclosure, for example. One possible communication between a client 1102 and a server 1104 can be in the form of a data packet transmitted between two or more computer processes wherein the data packet may include video data. The data packet can include metadata, e.g., associated contextual information, for example. The system 1100 includes a communication framework 1106 (e.g., a global communication network such as the Internet, or mobile network(s)) that can be employed to facilitate communications between the client(s) 1102 and the server(s) 1104.

Communications can be facilitated via a wired (including optical fiber) and/or wireless technology. The client(s) 1102 include or are operatively connected to one or more client data store(s) 1108 that can be employed to store information local to the client(s) 1102 (e.g., associated contextual information). Similarly, the server(s) 1104 are operatively include or are operatively connected to one or more server data store(s) 1110 that can be employed to store information local to the servers 1104.

In one embodiment, a client 1102 can transfer an encoded file, in accordance with the disclosed subject matter, to server 1104. Server 1104 can store the file, decode the file, or transmit the file to another client 1102. It is to be appreciated, that a client 1102 can also transfer uncompressed file to a server 1104 and server 1104 can compress the file in accordance with the disclosed subject matter. Likewise, server 1104 can encode video information and transmit the information via communication framework 1106 to one or more clients 1102.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described in this description can include electrical circuit(s) that can include components and circuitry elements of suitable value in order to implement the embodiments of the subject innovation(s). Furthermore, it can be appreciated that many of the various components can be implemented on one or more integrated circuit (IC) chips. For example, in one embodiment, a set of components can be implemented in a single IC chip. In other embodiments, one or more of respective components are fabricated or implemented on separate IC chips.

What has been described above includes examples of the embodiments of the present invention. It is, of course, not possible to describe every conceivable combination of components or methodologies for purposes of describing the claimed subject matter, but it is to be appreciated that many further combinations and permutations of the subject innovation are possible. Accordingly, the claimed subject matter is intended to embrace all such alterations, modifications, and variations that fall within the spirit and scope of the appended claims. Moreover, the above description of illustrated embodiments of the subject disclosure, including what is described in the Abstract, is not intended to be exhaustive or to limit the disclosed embodiments to the precise forms disclosed. While specific embodiments and examples are described in this disclosure for illustrative purposes, various modifications are possible that are considered within the scope of such embodiments and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the disclosure illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described in this disclosure may also interact with one or more other components not specifically described in this disclosure but known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer readable storage medium; software transmitted on a computer readable transmission medium; or a combination thereof.

Moreover, the words "example" or "exemplary" are used in this disclosure to mean serving as an example, instance, or illustration. Any aspect or design described in this disclosure as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Computing devices typically include a variety of media, which can include computer-readable storage media and/or communications media, in which these two terms are used in this description differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal that can be transitory such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

In view of the exemplary systems described above, methodologies that may be implemented in accordance with the described subject matter will be better appreciated with reference to the flowcharts of the various figures. For simplicity of explanation, the methodologies are depicted and described as a series of acts. However, acts in accordance with this disclosure can occur in various orders and/or concurrently, and with other acts not presented and described in this disclosure. Furthermore, not all illustrated acts may be required to implement the methodologies in accordance with certain aspects of this disclosure. In addition, those skilled in the art will understand and appreciate that the methodologies could alternatively be represented as a series of interrelated states via a state diagram or events. Additionally, it should be appreciated that the methodologies disclosed in this disclosure are capable of being stored on an article of manufacture to facilitate transporting and transferring such methodologies to computing devices. The term article of manufacture, as used in this disclosure, is intended to encompass a computer program accessible from any computer-readable device or storage media.

What is claimed is:

1. A system comprising:
a memory having stored thereon computer executable components; and
a processor configured to execute the following computer executable components stored in the memory:
an ingestion component to ingest segments of a live video stream in association with a request to process the live video stream;
a control component to generate an instruction graph for the live video stream based on predetermined criteria, wherein the instruction graph defines a workflow for processing the live video stream in real time, and wherein the workflow comprises a plurality of processing groups to respectively process copies of the segments in parallel and respectively output different formatted versions of the live video stream, wherein the plurality of processing groups respectively comprise sets of services to respectively perform different video processing tasks;
a transcoding component to execute the plurality of processing groups to respectively process the copies of the segments in parallel and in real time based at least in part on the instruction graph, wherein the transcoding component identifies a processing failure associated with a service of a set of services of one of the plurality of processing groups during process of an Nth segment of the segments, where N is an integer, and re-execute the one of the plurality of processing groups to re-process the Nth segment by the one of the plurality of processing groups while maintaining execution of other ones of the plurality of processing groups; and
a distribution component to stream processed segments to a client in real time for live broadcasting of the live video stream.

2. The system of claim 1, wherein the ingestion component ingests the segments sequentially, and wherein the transcoding component processes the segments in respective order of their receipt, and the distribution component streams a processed segment in response to completion of processing of the segment.

3. The system of claim 1, wherein the transcoding component processes a segment and the distribution component distributes the processed segment prior to receipt of all of the segments of the live video stream by the ingestion component.

4. The system of claim 1, wherein the distribution component streams a first segment of the live video stream processed via a processing group of the plurality of processing groups to the client before the processing group has completed process of a second segment of the live video stream.

5. The system of claim 1, wherein the ingestion component ingests the segments, and wherein the transcoding component processes the copies of the segments and the distribution component streams the processed segments substantially concurrently.

6. The system of claim 1, wherein respective services of the sets of services simultaneously perform their respective video processing tasks for multiple different video streams, and wherein the control component schedules the respective services of the sets of services to perform their respective video processing tasks for only the live video stream.

7. The system of claim 1, wherein services of the sets of services operate in a shared processing infrastructure that facilitates live video stream processing and non-live video stream processing, and wherein the control component provides priority to the live video stream processing by the services of the set of services over the non-live video stream processing.

8. The system of claim 1, wherein the transcoding component executes a set of services of a processing group by:
responsive to a first service of the set finishing processing one or more segments of the live video stream, streaming the one or more segments to a second service of the set; and
simultaneously processing the segments of the live video stream by the first service and the second service, wherein the first service continues processing one or more unprocessed segments of the live video stream and the second service processes the one or more segments of the live video stream streamed from the first service.

9. The system of claim 1, further comprising:
a buffer component to temporarily store segments of the live video stream as they are processed between services for a predefined window of time.

10. The system of claim 1, wherein services of the sets of services are part of a shared computing infrastructure and the control component selects the services of the sets of services based on availability of the respective services.

11. The system of claim 1, wherein services of the sets of services are part of a shared computing infrastructure comprising a plurality of services and the control component selects the services of the sets of services from the plurality of services based on availability of the respective services.

12. The system of claim 11, wherein the control component restricts the services of the sets of services to performing a single task defined in the instruction graph associated with processing the live video stream.

13. A method comprising:
using at least one microprocessor to execute computer executable instructions stored on at least one non-transitory computer readable medium to perform the following acts:
receiving segments of a live video stream of a live video broadcasting in association with a request to process the live video stream;
generating an instruction graph for the live video stream based on predetermined criteria, the instruction graph defining a workflow for processing the live video stream in real time, the workflow comprising a plurality of processing groups, wherein the plurality of processing groups respectively process copies of the segments in parallel and respectively output different formatted versions of the live video stream, wherein the plurality of processing groups respectively comprise sets of services configured to respectively perform different video processing tasks; and processing the live video stream based on the instruction graph, including:
- generating the copies of the segments;
- executing the plurality of processing groups to respectively process the copies of the segments in parallel based at least in part on the instruction graph;
- identifying a processing failure associated with a service of a set of services of one of the plurality of processing groups during the processing of an Nth segment of the segments, where N is an integer; and
- re-executing the one of the plurality of processing groups to re-process the Nth segment in response to the identifying the processing failure associated with the service of the first set of the services while maintaining execution of other ones of the plurality of processing groups.

14. The method of claim 13, further comprising streaming the segments in real time to a client in response to processing of the segments, wherein the receiving the segments, the processing the segments, and the streaming the segments are performed substantially concurrently.

15. The method of claim 13, further comprising streaming a first segment of the live video stream processed via a processing group of the plurality of processing groups to the client before the processing group has completed process of a second segment of the live video stream.

16. The method of claim 13, wherein respective services of the sets of services simultaneously perform their respective video processing tasks for multiple different video streams, and wherein the control component schedules the respective services of the sets of services to perform their respective video processing tasks.

17. The system of claim 13, wherein services of the sets of services operate in a shared processing infrastructure that facilitates live video stream processing and non-live video stream processing, the method further comprising providing priority to the live video stream processing by the services of the set of services over the non-live video stream processing.

18. The method of claim 13, wherein executing a set of services of a processing group comprises:
- responsive to a first service of the set finishing processing one or more segments of the live video stream, streaming the one or more segments to a second service of the set; and
- simultaneously processing the segments of the live video stream by the first service and the second service, wherein the first service continues processing one or more unprocessed segments of the live video stream and the second service processes the one or more segments of the live video stream streamed from the first service.

19. The method of claim 13, further comprising temporarily storing the segments of the live video stream as they are processed between services for a predefined window of time.

20. A non-transitory computer-readable storage medium comprising computer-readable instructions that, in response to execution, cause a computing system to perform operations, comprising:
- receiving segments of a live video stream of a live video broadcasting in association with a request to process the live video stream;
- generating an instruction graph for the live video stream based on predetermined criteria, the instruction graph defining a workflow for processing the live video stream in real time, the workflow comprising a plurality of processing groups, wherein the plurality of processing groups respectively process copies of the segments in parallel and respectively output different formatted versions of the live video stream, and wherein the plurality of processing groups respectively comprise sets of services to respectively perform different video processing tasks; and
- processing the live video stream based on the instruction graph, including:
  - generating the copies of the segments;
  - executing the plurality of processing groups to respectively process the copies of the segments in parallel based at least in part on the instruction graph;
  - identifying a processing failure associated with a service of a set of services of one of the plurality of processing groups during the processing of an Nth segment of the segments, where N is an integer; and
  - re-executing the one of the plurality of processing groups to re-process the Nth segment in response to the identifying the processing failure associated with the service of the first set of the services while maintaining execution of other ones of the plurality of processing groups.

* * * * *